Patented Dec. 4, 1945

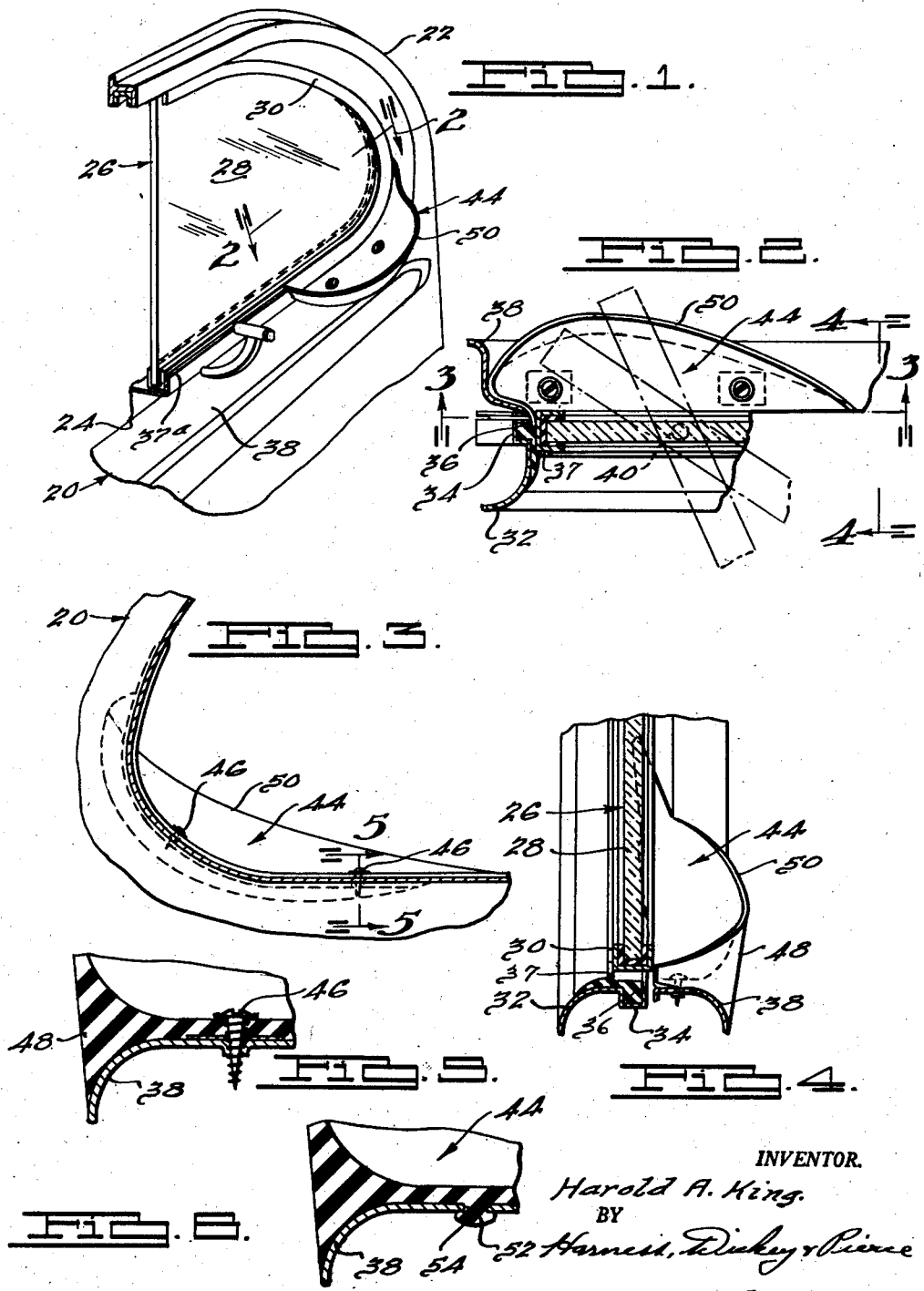

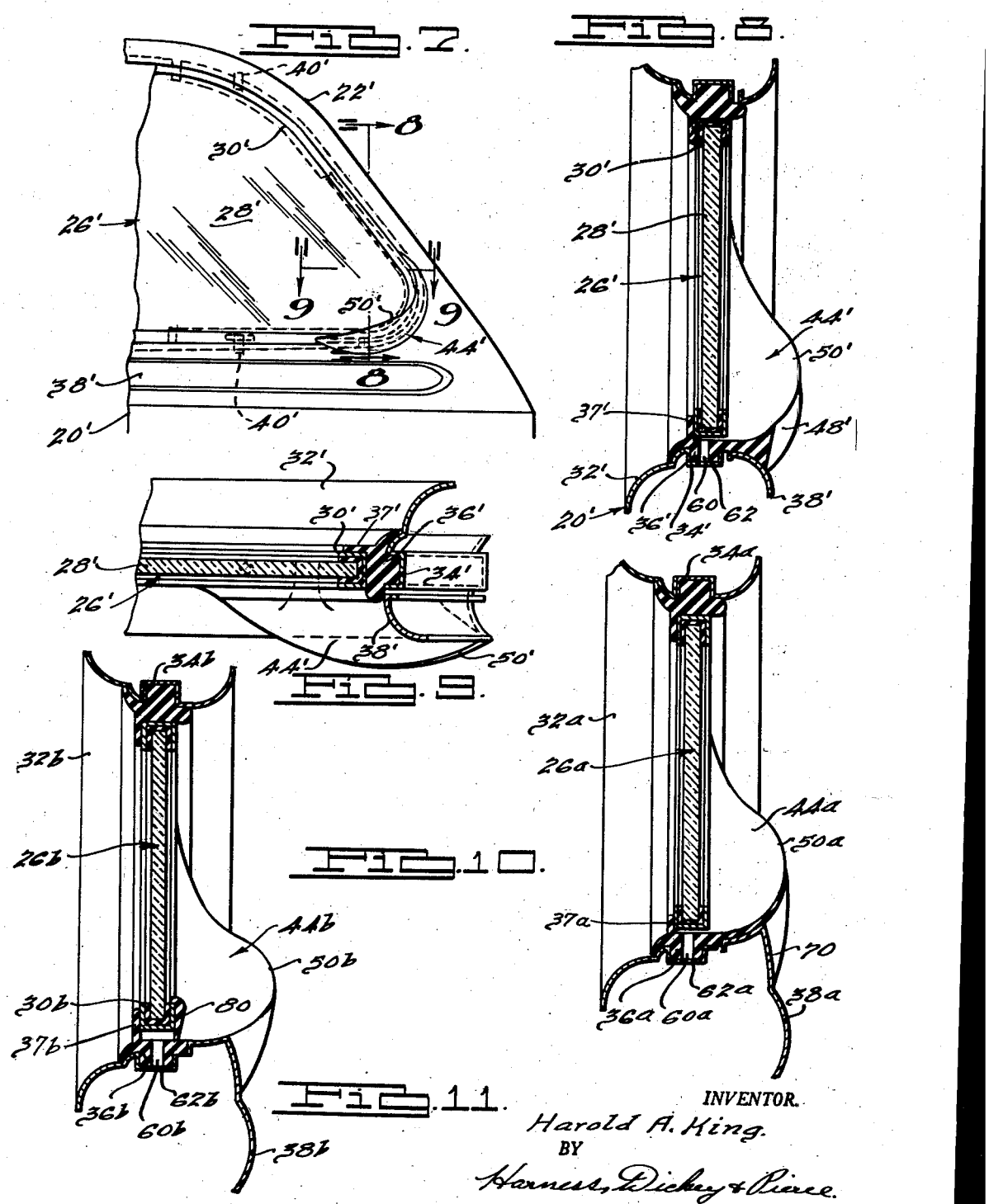

2,390,260

UNITED STATES PATENT OFFICE 2,390,260

AUTOMOTIVE VEHICLE

Harold A. King, Birmingham, Mich.

Application January 21, 1944, Serial No. 519,214

9 Claims. (Cl. 296—44)

This invention relates to automotive vehicles and has particular relation, but is not limited in its application, to those equipped with the so-called "no draft" ventilating windows, the principal object being the provision of a flexible or resilient means associated therewith for preventing a draft on the occupants of the adjacent seat when the ventilating windows are open and to prevent rain from being discharged through the ventilating windows when open and when the associated vehicle is being driven in the rain.

Objects of the invention include the provision, in combination with a movable ventilating window in an automobile or other vehicle body, of flexible or resilient means cooperating with the forward lower edge of the window for blocking the flow of air downwardly between it and the inner wall of the associated door and so cooperating with the lower forward edge of the window as to prevent rain draining to such edge of the window from being discharged into the passenger compartment of the vehicle body; the provision of a construction of the type described in which a resilient lip is interposed between such means and the ventilating window to provide a means to intercept, deflect and drain off excess water forced by wind or rain and drained from the window when open and the associated vehicle is at rest or in operation; the provision of a construction as above described in which a resilient lip cooperates between such means and the ventilating window to provide a water intercepting and deflecting dam or stop; the provision of means of the type described in which such means comprises an inwardly projecting resilient ledge-like or lipped flange device secured to the associated door along the forward portion of the lower edge of the window opening therein and extending vertically for the required distance; the provision of a device of the type described which when installed will cause no injury to passengers accidentally coming in contact with same in case of collision or accident; the provision of a device of the type described formed from rubber or rubber-like material; the provision of a device of the type described which may be applied as an accessory to already existing automobile body structures; the provision of a device of the type described which is formed as an integral part of the cooperating window sealing strip; and the provision of a device of the type described that is simple in construction, efficient in operation and relatively inexpensive to produce.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a fragmentary, partially broken, perspective view showing a portion of an automobile door equipped with a ventilating window and between which window and door a device of the present invention is shown associated;

Fig. 2 is an enlarged, fragmentary, horizontal sectional view taken on the line 2—2 of Fig. 1;

Fig. 3 is a fragmentary, vertical sectional view taken on the line 3—3 of Fig. 2;

Fig. 4 is a fragmentary, vertical sectional view taken on the line 4—4 of Fig. 2;

Fig. 5 is an enlarged, fragmentary vertical sectional view taken on the line 5—5 of Fig. 3;

Fig. 6 is a view similar to Fig. 5 but illustrating a modified form of securing means between the device of the present invention and the automobile door;

Fig. 7 is a fragmentary, side elevational view showing a portion of an automobile door and the associated ventilating window together with a device constructed in accordance with the present invention and formed as an integral part of the usual window sealing strip;

Fig. 8 is an enlarged, fragmentary vertical sectional view taken transversely of the construction shown in Fig. 7 as on the line 8—8 thereof;

Fig. 9 is an enlarged, fragmentary, horizontal sectional view taken on the line 9—9 of Fig. 7;

Fig. 10 is a view similar to Fig. 8 but illustrating another modified form of construction; and, Fig. 11 is a view similar to Fig. 8 and illustrating a further modified form of construction.

Most modern passenger automobiles are equipped with what is generally advertised to be "no draft" ventilation. This feature is obtained by the use of a small and generally triangularly shaped window located in the forward edge of the window opening in each forward door of the vehicle, and the rear quarter windows where provision for ventilation of the type described is provided, these ventilating windows being pivotally mounted in the corresponding window opening about a vertical axis located usually in the plane of the window midway of its forward and rear extremities and usually forwardly of such mid-point. When the ventilating window is in closed position its rear edge lies in sealed or substantially sealed relation with respect to the forward edge of the main vertically movable window carried by the door and which serves as a closure for the remainder of the window opening. When it is desired to ventilate the interior of the automobile body without lowering such main window, the ventilating window is pivoted about its axis so as to move its rear edge outwardly and its forward edge inwardly, this causing a suction to be created back of the rear edge of the ventilating window when the automobile is in forward motion which serves to suck out the foul air from the interior of the automobile body between the rear edge of the ventilating window and the forward edge of the main window and to replace such exhausted air by fresh air drawn into the automobile body between the forward edge of the window opening and the forward edge of the ventilating window.

Theoretically this mode of ventilating the interior of the automobile body is accomplished without the creation of unpleasant drafts within the automobile body but it is well recognized that, for instance, in cold weather when the ventilating window on the driver's side of the vehicle is employed for ventilating purposes, the cold air rushing into the automobile body between the forward edge of the ventilating window and the forward edge of the window opening in the doors or in the quarter panels is immediately discharged downwardly onto the driver's feet in the front of the automobile and onto the feet of the passengers in the rear of the automobile with the result that they often become uncomfortably cold. The same effect is experienced by the guest passenger in the front seat if the ventilating window on that side of the vehicle is likewise open. Additionally, when the automobile is being driven in the rain if a ventilating window is open to a material and often required extent necessary to prevent fogging of the windshield, the current of air flowing into the automobile body between the forward edge of the ventilating window and the forward edge of the corresponding window opening picks up rain which strikes the ventilating window and drains to the lower edge of the same and is carried by the air current created by the forward movement of the vehicle into the vehicle compartment and onto the clothes of the passengers sitting next to such window or windows.

It is the principal object of the present invention to provide means for overcoming the above described disadvantages of the conventional so-called "no draft" ventilation windows of present day automobiles in such a manner that the device will not injure a passenger should the passenger be thrown against the same. This is accomplished by the provision of a device formed principally from a flexible and resilient material in the form of a ledge, flange, or lip-like device secured to the corresponding door of the automobile body on the interior thereof and in a position to close the space between the door and the lower edge of the ventilating window forwardly of its pivotal axis when the ventilating window is pivoted out of the plane of the corresponding main window for ventilating purposes. This lip or ledge cooperates between the door and the ventilating window to shut off the flow of air downwardly between it and the inner wall of the door and, therefore, eliminates the downward draft at this point as above described which in cold weather ordinarily chills the feet of the adjacent passenger to an undesirable degree. At the same time, it is so constructed and arranged as to be in sealed or damming relation with respect to the lower edge of the ventilating window so as to intercept any rain or moisture which accumulates on the inwardly projecting portion of the ventilating window and prevents it from dripping down onto the passengers. The device is so constructed and arranged as to conduct such rain as it may collect under such circumstances to a point of discharge which will not inconvenience the passengers within the automobile body.

In order to obtain the proper seal between the device and the lower forward edge of the ventilating window it is necessary to provide a flexible, yieldable or resilient lip or edge cooperating between them which will yield to permit desired movement of the window while still maintaining the seal. In the broader aspects of the invention this flexible feather lip or edge may be provided either upon the window itself or upon the device of the present invention but in its preferred form the device itself is preferably formed of resilient material such as rubber or the like which in itself is provided with the flexible feather edge or lip in question. This flexible edge is arranged in at least partially intersecting relation with respect to the path of movement of the lower forward edge of the ventilating window so as to engage the same in sealing relation and yet readily yield to permit the desired pivoting movement of the ventilating window.

The device of the present invention may be made as a separate unit and applied as such to already existing automobiles of conventional construction simply by screwing or otherwise securing the device in position thereon. On the other hand where the device is to be employed in the production of new automobiles it will usually be found more economical and more desirable to form the same as an integral part of the usual rubber sealing strip employed for sealing the ventilating window to the cooperating edges of the window opening in the corresponding door when the ventilating window is in closed position, as in such case it eliminates the handling of a separate part and is secured in position simultaneously with the securement of the usual window sealing strip to the door.

Referring now to the accompanying drawings and particularly to Figs. 1 to 5, inclusive, that form of the device of the present invention which may be applied as an accessory to already existing automobile body constructions is shown by way of illustration. In Fig. 1 the forward upper portion of the forward lefthand door of a conventional automobile body is illustrated generally at 20, it being understood that in practice it will usually, although not necessarily, be hingedly connected at its forward, or righthand end as viewed in Fig. 1, to the front left pillar post of an automobile body in a conventional manner. It will also be appreciated that the door shown, being considered as a front door, its front upper corner is rounded off as at 22 along a curve of rather generous radius in more or less conformance with the curvature of the forward upper edge of the automobile body and that the upper portion of the door 22 is provided with a window opening 24 therein the top and sides of which conform more or less to the curvature or shape of the upper portion of the door. The forward portion of the window opening 22 is normally occupied by a ventilating window indicated generally at 26 and that portion of the window opening 24 rearwardly of the window 26 is occupied by a conventional vertically movable window (not shown). In practice a suitable seal is provided between the rear edge of the window 26 and the main window so as to seal the joint between them when the window is raised and the window 26 is in its closed position shown.

The window 26 comprises a glass transparency 28 and a metallic frame 30 of channel-shaped section in which all of the edges of the transparency 28 except the rear edge thereof is received and secured.

The door 20 shown is of conventional construction, that is it is formed of a sheet metal outer panel 32 which, as best brought out in Figs. 2 and 4, is curved inwardly around the window opening 24 and over the length of the frame 30 is formed to provide an inwardly opening channel 34 in which is received a rubber sealing strip 36 which engages the frame 30 when the window 26 is in closed position to seal the joint between the window 26 and the door. Forwardly of the pivotal axis of the window 26 the sealing strip 36 is provided with an integral upstanding bead or flange 37 (see Fig. 4) against which the outer face of this portion of the window presses when in closed position to effect a tight seal. A similar bead or flange 37a (see Fig. 1) is provided for the same purpose on the inside of the window and rearwardly of its pivotal axis. A conventional garnish molding 38 bounds the inner side of the window opening 24 and is secured in place to the door frame in a conventional manner, its outer edge extending into relatively close relationship with respect to the channel 34 of the door panel 32 as best brought out in Fig. 4.

The window 26 is mounted for pivotal movement in the window opening 24 by means of a pair of pivot pins 40 one of which is illustrated in Fig. 2 and which are secured to the frame 30 in outwardly projecting relationship with respect thereto in vertical alignment with each other at approximately the position illustrated in Fig. 2 longitudinally of the window 26, the pins 40 being suitably rotatably supported in suitable openings provided therefor in the door frame. It will be appreciated from an inspection of Fig. 2 that the pivot pins 40 are located on a vertical axis intermediate, that is, between, the front and rear edges of the window 26 and in the embodiment shown slightly closer to the forward edge than the rear edge so that the window, in pivoting about the axis of the pins 40, will project to a smaller extent on the interior of the body than on the exterior thereof.

In Fig. 2 the window 26 is shown in closed position in full lines and is shown in two different positions of opening in dash and dot lines. It will be appreciated from an inspection of Fig. 2 that when the device of the present invention is not present, when the window 26 is in any pivotal position wherein its forward edge is spaced inwardly from the sealing strip 36 and the automobile of which it is a part is in forward motion, the suction created behind the outwardly projecting rear portion of the window will cause a flow of air into the interior of the body between the forward edge of the window 26 and the forward edge of the window opening 24. Particularly in cold weather where the natural tendency of cold air is to flow downwardly this entering air will have a tendency to flow downwardly over the inside face of the door and, therefore, in the case of the particular door shown, onto the feet of the driver of the automobile. Additionally, when the window 26 is opened, when it is raining and the automobile is in motion, the rain which strikes the window 26 will have a tendency to drain by gravity, plus wind pressure, toward the lower edge of the same and because of the flow of air forwardly over the outer face of the window 26 toward the interior of the automobile body this rain collecting along the lower and forward edges and particularly on the lower and forward portion of the window 26 will be caused by the action of the air to be discharged into the interior of the body, usually upon the person sitting next to such window. As previously stated it is the object of the present invention to overcome particularly the two above described disadvantages of conventional constructions.

In accordance with the present invention and in the form thereof illustrated in Figs. 1 to 5, inclusive, the above described disadvantages are obviated by securing to the door 20 a device indicated generally at 44 which will cooperate with the forward and lower edge of the window 26 when swung inwardly into ventilating position and serve to obviate such disadvantages. The device 44 is preferably formed from rubber or like material and extends preferably from a point spaced rearwardly from the hinge pins 40 for the window 26 to the forward edge of the door opening 24. It consists essentially of an inwardly projecting flange or ledge the outer edge of which may be substantially straight in plan view as shown and aligned with the edge of the corresponding portion of the garnish molding 38, its forward end being curved as brought out in Fig. 2 so as to conform to and lie against the adjacent forward portion of the garnish molding 38, and the inner edge of which is inwardly bowed or curved as best brought out in Figs. 1 and 2. Its lower surface is formed for complementary reception of the upper surface of the corresponding portion of the garnish molding 38 and in the construction illustrated in Figs. 1 to 5, inclusive, is shown secured thereto by means of screws 46. Additionally, an adhesive or other cement-like material may be used between the device and the garnish molding to enhance the security of the connection and the tightness of the seal between them if this is deemed desirable. Its upper surface is substantially flat from its outer edge to a point spaced from its inner and forward edges and then curves upwardly to meet the inner wall 48 thereof in a relatively thin upwardly projecting and flexible lip 50 which extends the full length of the device, that is from the forward edge of the inner side inwardly around the inner margin to the rear end of such inner side. The lip 50 projects upwardly into intersecting relation with respect to the path of movement of the lower edge of that portion of the window 26 which swings inwardly about the pivots 40 when the window 26 is moved to ventilating position and is of sufficient flexibility so as to readily yield to permit the lower edge of the window 26 to swing over it, but at the same time is of sufficient strength to maintain a liquid-tight deflecting seal between it and the lower edge of the window.

It will thus be appreciated that the device of the present invention comprises a partially cup-shaped flexible or resilient flange or ledge which makes substantial contact with the lower edge of the inwardly moving portion of the ventilator window when the latter is swung to ventilating position and which not only acts to deflect the incoming air upwardly as the air passes over it but, in being sealed to the lower edge of the window and being upwardly directed, tends to catch or intercept any rain or other water attempting to flow forwardly along the lower edge of the window and collect such rain or water therein, thereby preventing the rain or water from being carried on into the interior of the automobile body to the discomfort of the passengers therein. The rain or water that thus collects in the shield 44 will have a natural tendency to flow to the rear end of the same and be discharged either to the outside of the door or down into the interior of the door where it may drain out in the usual and conventional manner.

It will be appreciated that the device illustrated in Figs. 1 to 4, inclusive, is of a type that may be readily applied to existing automobiles as an accessory although, of course, it may be equally well applied to new automobiles during production of the same if desired. The form of securement best brought out in Fig. 5 is particularly adapted to application of the device as an accessory. Where it is to be applied in production in the form illustrated in Figs. 1 to 5 it may be preferable to secure it in position in the manner illustrated in Fig. 6 in which case it will be noted that instead of employing screws as the screws 46, an equivalent number of headed bosses or buttons such as 52 may be formed on the under surface of the same and corresponding holes such as 54 punched or otherwise formed in the garnish molding 38 to receive them, the buttons 52 in such case being pushed through the holes 54 and the resulting interlocking effect serving to secure the device in position. It will be appreciated that this form of connection will be more economical and will permit the device to be applied in a shorter period of time.

In Figs. 7, 8 and 9 a modified form of construction is shown which is preferably employed where the device of the present invention is adapted to automobile bodies during the production of the same. Inasmuch as the only difference in the construction illustrated in Figs. 7, 8 and 9 from that already described is in the one particular mentioned, all of the remaining parts of the structure shown are indicated by the same numerals as in Figs. 1 to 5, inclusive, with the exception that such numerals bear a prime mark, thus rendering it unnecessary to specifically describe the construction in general as this will already be understood.

It will be observed that in the modification shown in Figs. 7, 8, and 9 the lip or shelf device 44' is formed as an integral part of the sealing strip 36' received within the channel 34' of the door 20'. The shape of the door 20' and a cross-sectional contour of the door panel 32' and garnish molding 38', in this case is slightly different from that shown in the preceding views, and the sealing strip 36' and device 44' has necessarily been altered to conform thereto, but it will be appreciated that the device 44' is essentially of the same general configuration as in the first described construction and cooperates with the inwardly movable portion of the window 26 in the same manner. In other words, the forward and lower edge of the window 26 in moving inwardly will wipe over the flexible upper edge 50' of the device 44' and it will serve to catch any water or moisture that is attempting to flow forwardly along the lower forward edge of the window 26, and to drain such water or moisture into the bottom of the device 44'. In this particular construction the sealing strip 36' is shown as being provided with a drain hole 60 for receiving any such water or moisture thus collecting in the member 44', such water or moisture being discharged down through the hole 60 and through an aligned hole 62 formed in the bottom of the channel 34', thus discharging such water or moisture to the interior of the door 20' from which it may drain in the usual manner. At the same time the member 44' in closing the space between the inner face of the door 20' and the lower edge of the window 26' at its forward end when the latter is moved to ventilating position, prevents a draft of air from flowing directly through the space thus provided between the forward edge of the window 26' and the forward edge of the door opening downwardly onto the feet of the adjacent passenger. In this construction, the member 44' being formed integrally with the sealing strip 36' it is, of course, applied simultaneously therewith and involves no additional labor or expense in its application to the automobile body.

In Fig. 10 a further modified form of construction is shown and for the purpose of simplicity in description those parts equivalent to the parts previously described are indicated by the same numerals except that such numerals bear the sub-letter $a$, thus rendering it unnecessary to describe anything except the changed part. It will be observed that generally the construction shown in Fig. 10 is substantially the same as that shown in Figs. 7, 8, and 9, the device 44a of the present invention in this case being formed integrally with the sealing strip 36a. In this particular case in order to economize on the amount of rubber or like material employed in the member 44a the garnish molding 38a adjacent to the member 44a is extended upwardly as indicated at 70 so as to replace a portion of the bulk of the rubber of the device 44' in the construction illustrated in Fig. 8. In other words the garnish molding 38a is simply extended upwardly and outwardly over the length of the device 44a, as compared to the constructions previously described, so as to displace a portion of the volume of the device of the present invention as previously shown and, therefore, eliminate the necessity of employing an equivalent mass of rubber. Otherwise the construction shown in Fig. 10 is identical to the construction shown in Figs. 7, 8, and 9 and operates in identically the same manner.

Where the question of the use of rubber is critical, a modification may be made which will effect still greater savings in the amount of rubber necessary to obtain the effects of the present invention and such construction is illustrated in Fig. 11. In this figure in order to simplify the description parts equivalent to those shown in the preceding views are indicated by the same numerals except that such numerals bear the sub-letter $b$ and, therefore, except for the changed features no detailed explanation of the same is required. It will be observed that except for the modified form of the device of the present invention the construction illustrated in Fig. 11 is identical to that shown in Figs. 8 and 9. In this case instead of forming the inwardly projecting shelf or lip of the present invention of rubber or rubber-like material the garnish molding 38b has itself been formed to provide the lip or shelf of the present invention directly therein except that in this case the narrow upper edge 50b of the member 44b is not extended upwardly to a sufficient extent as to intersect the path of movement of the lower forward edge of the window 26 when the latter is moved inwardly to a ventilating position, such lower edge of the window in this case having a suitable amount of clearance between it and such lower forward edge of the window 26. In order to effect an equivalent result, that is to provide a wiping seal between the lower forward edge of the window and the member 44, in this case a flexible rubber or the like blade or strip 80 is secured and sealed to the inner face of the window frame 30b from a point adjacent or in line with the pivotal axis of the window 26b to the forward terminus of the member 44b. The lower edge of the blade 80 being flexible and extending into intersecting relation with respect to the upper edge 50b of the member 44b when the window 26b is swung inwardly for ventilation purposes, it effects the same character of rain seal as in the previously described construction and, of course, effects the same result, the difference in this case being that the flexible edge is on the window instead of on the member 44b.

Having thus described my invention, what I claim by Letters Patent is:

1. In an automobile body door of the class wherein a window opening is provided therein and a ventilating window is mounted in the forward portion of the window opening for pivotal movement about a vertically directed axis located between the front and rear edges of said window, the combination with said door and window of a concave ledge projecting laterally inwardly from said door and extending longitudinally of said door from a point adjacent said pivotal axis to the forward edge of said window opening on approximately the level of the lower edge of said window opening, a resilient lip projecting upwardly from the inner edge of said ledge over the major portion of the length thereof into intersecting relation with respect to the path of movement of the lower edge of said window when the forward end thereof is pivoted inwardly away from the plane of said door, said lower edge of said window overriding said lip when said window is opened to a material angular extent without permanently deforming said lip to intercept water flowing along the lower edge of said window and thereby cause it to enter the concavity in said ledge, and a drainage passage communicating with said concavity and through which said water may escape.

2. In an automobile body door of the class wherein a window opening is provided therein and a ventilating window is mounted in the forward portion of the window opening for pivotal movement about a vertically directed axis located between the front and rear edges of said window, the combination with said door and window of a ledge projecting laterally inwardly from said door and extending longitudinally of said door from a point adjacent said pivotal axis to the forward edge of said window opening on approximately the level of the lower edge of said window opening, the inner marginal portion of said ledge curving upwardly and terminating in a resilient lip arranged in intersecting relation with respect to the path of movement of the lower forward edge of said window, said lip being sufficiently yieldable to permit said lower edge of said window to override it without permanent deformation thereof when said window is opened to a material angular extent.

3. In an automobile body door of the class wherein a window opening is provided therein and a ventilating window is mounted in the forward portion of the window opening for pivotal movement about a vertically directed axis located between the front and rear edges of said window, the combination with said door and window of a ledge of resilient material sealed and secured to said door at the lower forward edge of said window opening and extending inwardly and upwardly therefrom and terminating in a flexible edge arranged in intersecting relation to the path of movement of the lower forward edge of said window when the forward end thereof is pivoted inwardly away from the plane of said door, said flexible edge being sufficiently yieldable to permit said lower edge of said window to override it without permanent deformation thereof when said window is opened to a material angular extent.

4. In an automobile body door of the class wherein a window opening is provided therein and a ventilating window is mounted in the forward portion of the window opening for pivotal movement about a vertically directed axis located between the front and rear edges of said window, the combination with said door and window of a ledge of rubber-like material sealed and secured to said door at the lower forward edge of said window opening and extending inwardly and upwardly and forwardly therefrom and terminating in a flexible edge arranged in intersecting relation to the path of movement of the lower forward edge of said window when the forward end thereof is pivoted inwardly away from the plane of said door, said flexible edge being sufficiently yieldable to permit said lower edge of said window to override it without permanent deformation thereof when said window is opened to a material angular extent.

5. In an automobile body door of the class wherein a window opening is provided therein, a ventilating window is mounted in the forward portion of the window opening for pivotal movement about a vertically directed axis, and a resilient sealing strip is carried by the door for engagement with the window when the latter lies substantially in the plane of the door, the combination with said sealing strip of a part formed integrally therewith and projecting inwardly of said door therefrom at the lower forward portion of said window opening, said part bridging at least a portion of the space occurring between the forward lower edge of said window and said door when the forward end of said window is moved inwardly of said door about its axis and out of the plane of said door.

6. In an automobile body door of the class wherein a window opening is provided therein a ventilating window is mounted in the forward portion of the window opening for pivotal movement about a vertically directed axis, and a resilient sealing strip is carried by the door for engagement with the window when the latter lies substantially in the plane of the door, the combination with said sealing strip of a part formed integrally therewith and projecting inwardly of said door therefrom at the lower forward portion of said window opening, said part bridging at least a portion of the space occurring between the forward lower edge of said window and said door when the forward end of said window is moved inwardly of said door about its axis and out of the plane of said door, and an upwardly extending flexible lip extending along the inner and forward margins of said part extending into intersecting relation with respect to the path of movement of said forward lower edge of said window.

7. In an automobile body door of the class wherein a window opening is provided therein and a ventilating window is mounted in the forward portion of the window opening for pivotal movement about a vertically directed axis located between the front and rear edges of said window, the combination with said door and window of a concave ledge projecting laterally inwardly from said door and extending longitudinally of said door from a point adjacent said pivotal axis to the forward edge of said window opening on approximately the level of the lower edge of said window opening, a strip of flexible rubber-like material secured to the lower edge of said window over a length thereof approximately coextensive with said ledge and projecting downwardly below said lower edge and into wiping engagement with at least a portion of said ledge when said window is moved about its pivotal axis to a ventilating position, said strip being adapted to override the free edge of said ledge without permanent deformation when said window is opened to a material angular extent, whereby any water flowing along the lower edge of said window is intercepted and caused to enter the concavity in said ledge, and a drainage passage communicating with said concavity and through which water may escape.

8. In an automobile body door of the class wherein a window opening is provided therein, a ventilating window is mounted in the forward portion of the window opening for pivotal movement about a vertically directed axis, and a resilient sealing strip is carried by the door for engagement with the window when the latter lies substantially in the plane of the door, the combination with said sealing strip of a part formed integrally therewith and projecting inwardly of said body beyond the inner edge of said window opening from a point approximately in transverse alignment with said axis to a point adjacent the forward edge of said window opening, said part terminating at its inner edge in an upwardly directed resilient lip arranged in intersecting relation with respect to the path of movement of the lower edge of said ventilating window for wiping engagement with said edge when the forward end of said ventilating window is pivoted inwardly out of the plane of said window opening.

9. In an automobile body door of the class wherein a window opening is provided therein and a ventilating window part is mounted in the forward portion of the window opening for pivotal movement about a vertical axis, the combination with said door and window part of a concave ledge part carried by said door and projecting laterally inwardly thereof between said axis and the leading edge of said window opening, one of said parts having an elongated resilient lip which extends angularly across and which yieldably engages the other of said parts when said window part is pivoted to move the forward end thereof inwardly out of the plane of said door, said lip being temporarily deformed at its point of engagement with said last mentioned part, whereby any water flowing along the lower edge of said window part is intercepted and caused to enter the concavity in said ledge part, and a drainage passage communicating with said concavity and through which said water may escape.

HAROLD A. KING.